United States Patent
Faust et al.

(10) Patent No.: US 10,661,999 B2
(45) Date of Patent: May 26, 2020

(54) ALIGNMENT ASSEMBLY

(71) Applicant: Packaging Progressions, Inc., Souderton, PA (US)

(72) Inventors: Charles D. Faust, Bensalem, PA (US); Dante M. Pietrinferni, Douglassville, PA (US)

(73) Assignee: Packaging Progressions, Inc., Souderton, PA (US)

( * ) Notice: Subject to any disclaimer, the term of this patent is extended or adjusted under 35 U.S.C. 154(b) by 0 days.

(21) Appl. No.: 16/286,806

(22) Filed: Feb. 27, 2019

(65) Prior Publication Data
US 2019/0291969 A1 Sep. 26, 2019

Related U.S. Application Data

(60) Provisional application No. 62/646,509, filed on Mar. 22, 2018.

(51) Int. Cl.
*B65G 47/26* (2006.01)
*B65G 43/00* (2006.01)
*B65G 15/10* (2006.01)

(52) U.S. Cl.
CPC ........... *B65G 47/261* (2013.01); *B65G 43/00* (2013.01); *B65G 47/266* (2013.01); *B65G 15/105* (2013.01); *B65G 2203/0233* (2013.01); *B65G 2203/044* (2013.01)

(58) Field of Classification Search
CPC .. B65G 47/266; B65G 47/88; B65G 47/8807; B65G 47/8815; B65G 47/8823; B65G 47/8876; B65G 47/261; B65G 43/00; B65G 2203/0233; B65G 2203/044; B65G 15/10; B65G 15/105; B65G 15/12
USPC ................................ 198/419.1, 459.6–459.7
See application file for complete search history.

(56) References Cited

U.S. PATENT DOCUMENTS

| | | | |
|---|---|---|---|
| 3,044,638 A | 7/1962 | Bruce | |
| 4,807,741 A * | 2/1989 | Simelunas | B65B 5/10 198/477.1 |
| 4,969,310 A | 11/1990 | Lerner et al. | |
| 5,137,140 A * | 8/1992 | Lecrone | B65G 21/2072 198/732 |
| 5,165,152 A | 11/1992 | Kramer et al. | |
| 5,303,811 A * | 4/1994 | Haley | B65G 47/29 198/419.1 |
| 5,454,687 A * | 10/1995 | Johnson | B65G 57/32 198/370.1 |
| 5,551,550 A * | 9/1996 | Marshall | B65G 47/82 198/419.3 |
| 5,855,153 A | 1/1999 | Cote et al. | |
| 6,918,736 B2 * | 7/2005 | Hart | B65B 5/10 414/788.9 |

(Continued)

*Primary Examiner* — Mak A Deuble
(74) *Attorney, Agent, or Firm* — Brinks Gilson & Lione

(57) ABSTRACT

An alignment system is disclosed. The system includes at least one arm including a plurality of fingers, and a linkage bar connected to the at least one arm. A sensor is adapted to detect a presence of a product. A controller is configured to selectively drive the linkage bar based on a signal from the sensor such that the plurality of fingers are driven between: (1) a first position in which the plurality of fingers are adapted to extend into a conveying path of a product conveyor, and (2) a second position in which the plurality of fingers are adapted to be positioned away from the conveying path of the product conveyor.

20 Claims, 11 Drawing Sheets

(56) References Cited

U.S. PATENT DOCUMENTS

| | | |
|---|---|---|
| 8,235,200 B2 * | 8/2012 | Fischbacher ............ B65B 21/06 |
| | | 198/419.1 |
| 2003/0167799 A1 | 9/2003 | Tijerina-Ramos et al. |
| 2006/0182603 A1 | 8/2006 | Hawes |
| 2008/0019818 A1 * | 1/2008 | Kent ...................... B65G 57/03 |
| | | 414/788.1 |
| 2009/0028686 A1 | 1/2009 | Tallis et al. |
| 2010/0316469 A1 | 12/2010 | Lert et al. |
| 2011/0036684 A1 | 2/2011 | Bonnain |
| 2014/0126986 A1 | 5/2014 | Corallo et al. |

* cited by examiner

ALIGNMENT ASSEMBLY

CROSS REFERENCE TO RELATED APPLICATION

This application claims the benefit of U.S. Provisional Application No. 62/646,509 filed Mar. 22, 2018, which is incorporated by reference as if fully set forth.

FIELD OF INVENTION

The present invention relates to an alignment device, and more particularly relates to an alignment device for a conveyor assembly.

BACKGROUND

Multi-lane conveyor systems are well known. In these systems, rows of products are advanced by conveyors between processing stages, such as interleaving, stacking, etc. It is desirable to ensure that the rows of products are advanced by the conveyor along a predetermined centerline or path. If products deviate from this predetermined centerline, then the subsequent processing procedures experience complications and issues. For example, attempting to stack misaligned products results in the product stacks being unsteady and off-center. Misaligned product stacks cause production issues and/or require production personnel to manually align the product stacks. Fixing misaligned product stacks is time-consuming and cost-prohibitive.

Accordingly, there is a need to provide an alignment configuration that ensures alignment of advancing products on a conveyor.

SUMMARY

An improved alignment system is disclosed herein that aligns advancing products in accordance with a predetermined centerline.

In one embodiment, the alignment system includes an alignment assembly including at least one arm including a plurality of fingers, and a linkage bar connected to the at least one arm. A sensor is adapted to detect a presence of a product. A controller is configured to selectively drive the linkage bar based on a signal from the sensor such that the plurality of fingers are driven between: (1) a first position in which the plurality of fingers are adapted to extend into a conveying path of a product conveyor, and (2) a second position in which the plurality of fingers are adapted to be positioned away from the conveying path of the product conveyor.

In one embodiment, the at least one arm includes a plurality of arms.

In another embodiment, a conveyor arrangement is provided. The arrangement includes a product conveyor and the alignment system disclosed herein.

In one embodiment, the linkage bar is mounted above the product conveyor. In another embodiment, the linkage bar is mounted below the product conveyor, and the plurality of fingers extend between a plurality of bands of the product conveyor in the first position.

In another embodiment, a method of aligning products on a product conveyor is provided. The method includes providing the conveyor arrangement. The method includes advancing products on the product conveyor into engagement with the plurality of fingers such that the products are shifted to align with a predetermined centerline. The method includes detecting a presence of the products within an area defined between the plurality of fingers via the sensor. The method includes driving the plurality of fingers between: (1) a first position in which the plurality of fingers extend between into the conveying path of the product conveyor, and (2) a second position in which the plurality of fingers are positioned away from the conveying path of the product conveyor based on the signal from the sensor.

In one embodiment, the controller is configured to (1) wait a first determined time period after the sensor detects the presence of the products, and (2) wait a second predetermined time period before driving the plurality of fingers back to the first position from the second position.

In one embodiment, the products being aligned by the alignment system are meat patties.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Figure 1:
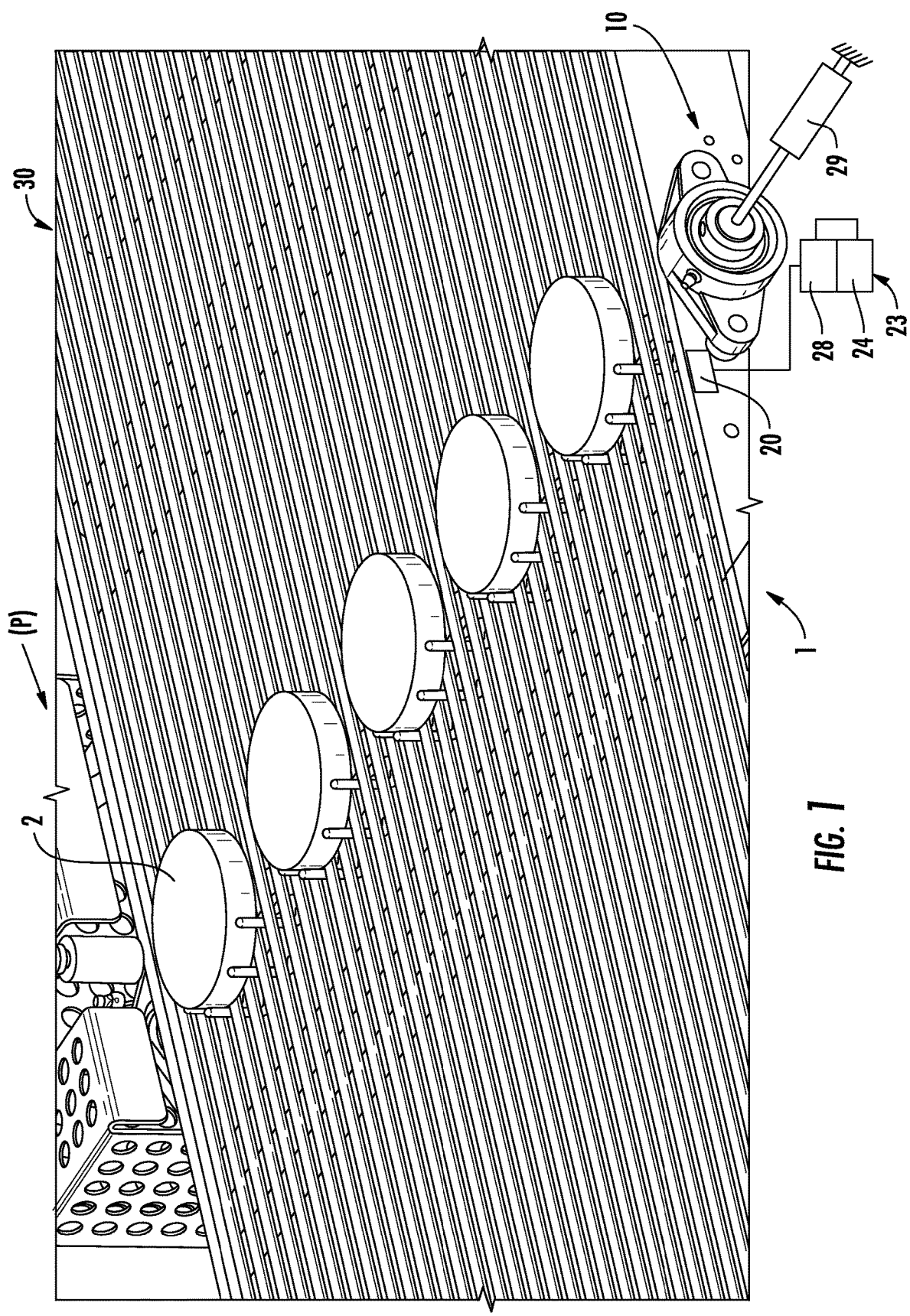
FIG. 1 is a perspective view of an alignment system according to one embodiment.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

As shown in FIG. 1, an alignment system 1 is provided that generally includes an alignment assembly 10, a sensor 20, and a controller 23, which are each described in more detail below.

Figure 3:
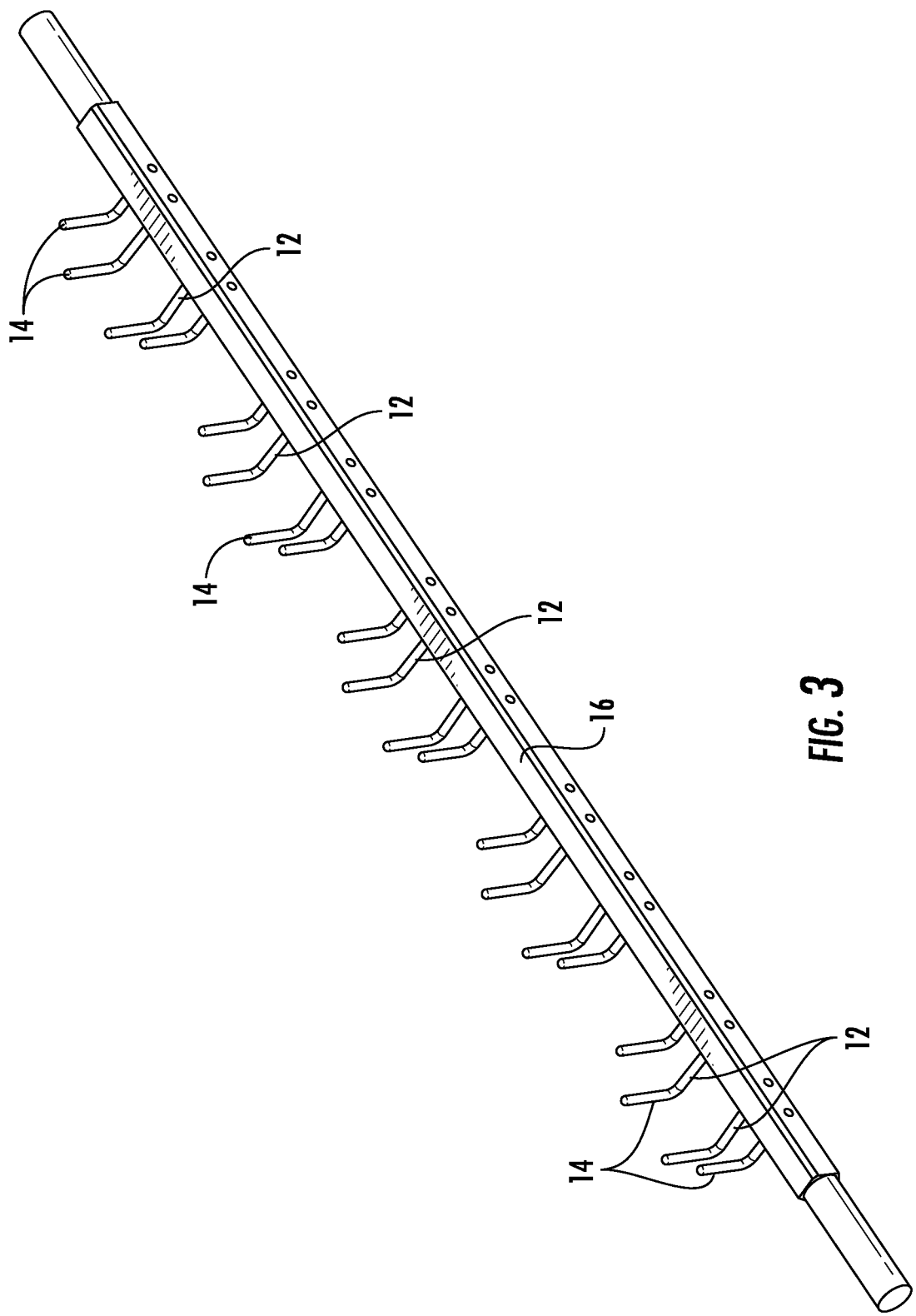
FIG. 3 is a perspective view a linkage bar for the alignment system of FIGS. 1 and 2.

The alignment assembly 10 includes at least one arm 12 that includes a plurality of fingers 14. In one embodiment, the at least one arm 12 includes a plurality of arms 12. A linkage bar 16 is connected to the plurality of arms 12. In one embodiment, the plurality of arms 12 includes five arms. In one embodiment, the plurality of fingers 14 on each arm 12 includes four fingers. One of ordinary skill in the art would recognize from the present disclosure that the number of arms and fingers can be varied depending on the specific application and requirements. The fingers 14 are preferably formed from food-grade plastic or metal. As shown in the drawings, the arms 12 and fingers 14 generally have an L-shaped profile. In another embodiment, the arms 12 and fingers 14 have an S-shaped profile. One of ordinary skill in the art would understand that the shape of the arms 12 and fingers 14 can vary. The linkage bar 16 is shown in more detail in FIG. 3.

Figure 2:
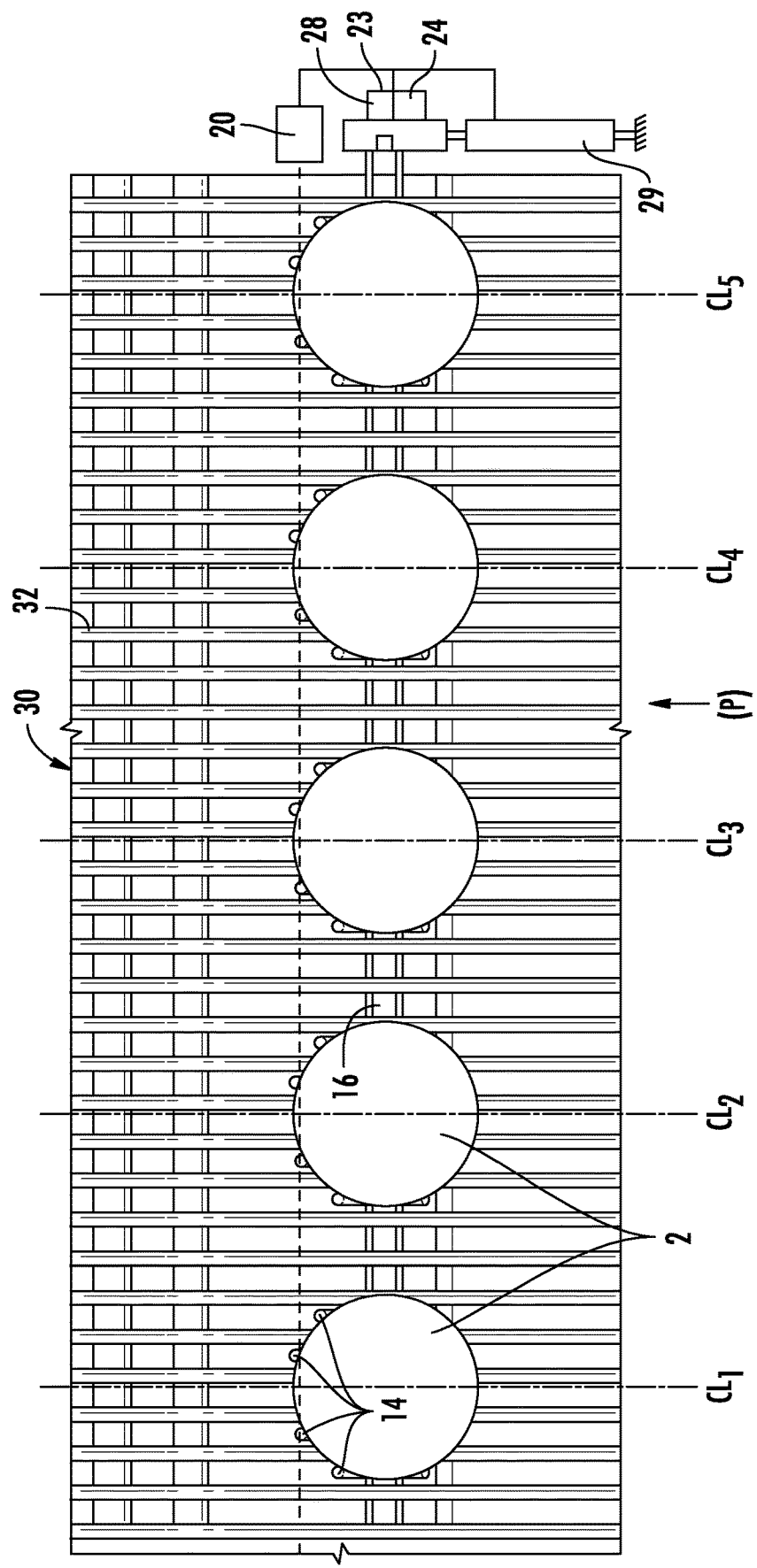
FIG. 2 is a top view of the alignment system of FIG. 2.

As best shown in FIG. 2, the set of fingers 14 on each arm 12 have an arcuate orientation. As shown in FIG. 2, the profile of the tips of the fingers 14 on each arm 12 generally correspond to the profile of the leading edges of the products 2. As shown in the drawings, the leading edge of the products 2 generally has a rounded profile. A centerline defined by the arcuate orientation of the fingers 14 corresponds to a predetermined centerline, described in more detail below.

The sensor 20 is adapted to detect a presence of a product 2. The sensor 20 can detect the presence of products 2 in a variety of ways. The sensor 20 can detect the presence of the products with in an area defined between each set of fingers 14. In one embodiment, the sensor 20 detects a leading edge of a leading product 2 in a row of products.

As shown in the drawings, the products 2 are illustrated as round patties. In one embodiment, the products 2 are hamburger patties. In one embodiment, the products 2 are meat patties and are maintained at 28° F.-32° F. One of ordinary skill in the art would understand that the products 2 can be any type of food, consumer product, etc. The sensor 20 can be any known type of sensor, such as a photo-sensor, pressure sensor, etc. As shown in FIG. 2, the sensor 20 is mounted in a generally forward position with respect to the fingers 14, and is directed laterally across the underlying conveyor 30. One of ordinary skill in the art would understand that sensors could be located in any position relative to the alignment assembly 10, such as above the conveyor 30, below the conveyor 30, or any other position capable of detecting the presence of products 2 proximal to the alignment assembly 10.

The controller 23 is generally configured to selectively drive the linkage bar 16 based on a signal from the sensor 20. The term controller is used herein to refer to any known type of electronic component capable of an input/output function, including any one or more of the following: driver circuitry, programmable logic controller (PLC), central processing unit (CPU), memory unit, input/output circuit, and control unit. As shown in FIGS. 1 and 2, in one embodiment, the controller 23 includes a memory unit 24 and a processor unit 28. The controller 23 is connected to the sensor 20 and an actuator 29, such as a pneumatic cylinder or a servo motor.

Figure 4A:
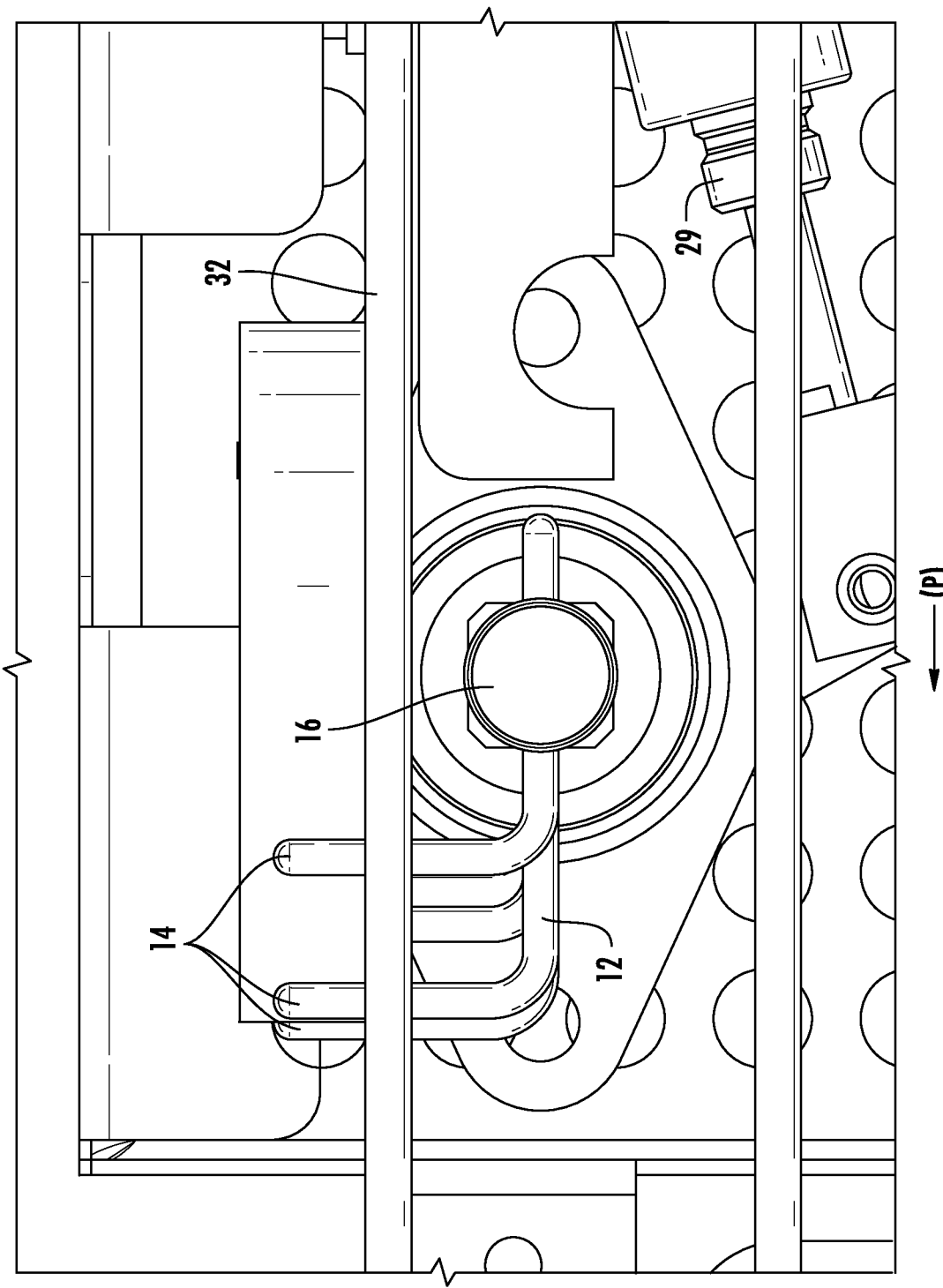
FIG. 4A is a side view of the alignment system of FIGS. 1 and 2 with the linkage bar in a first position.
Figure 4B:
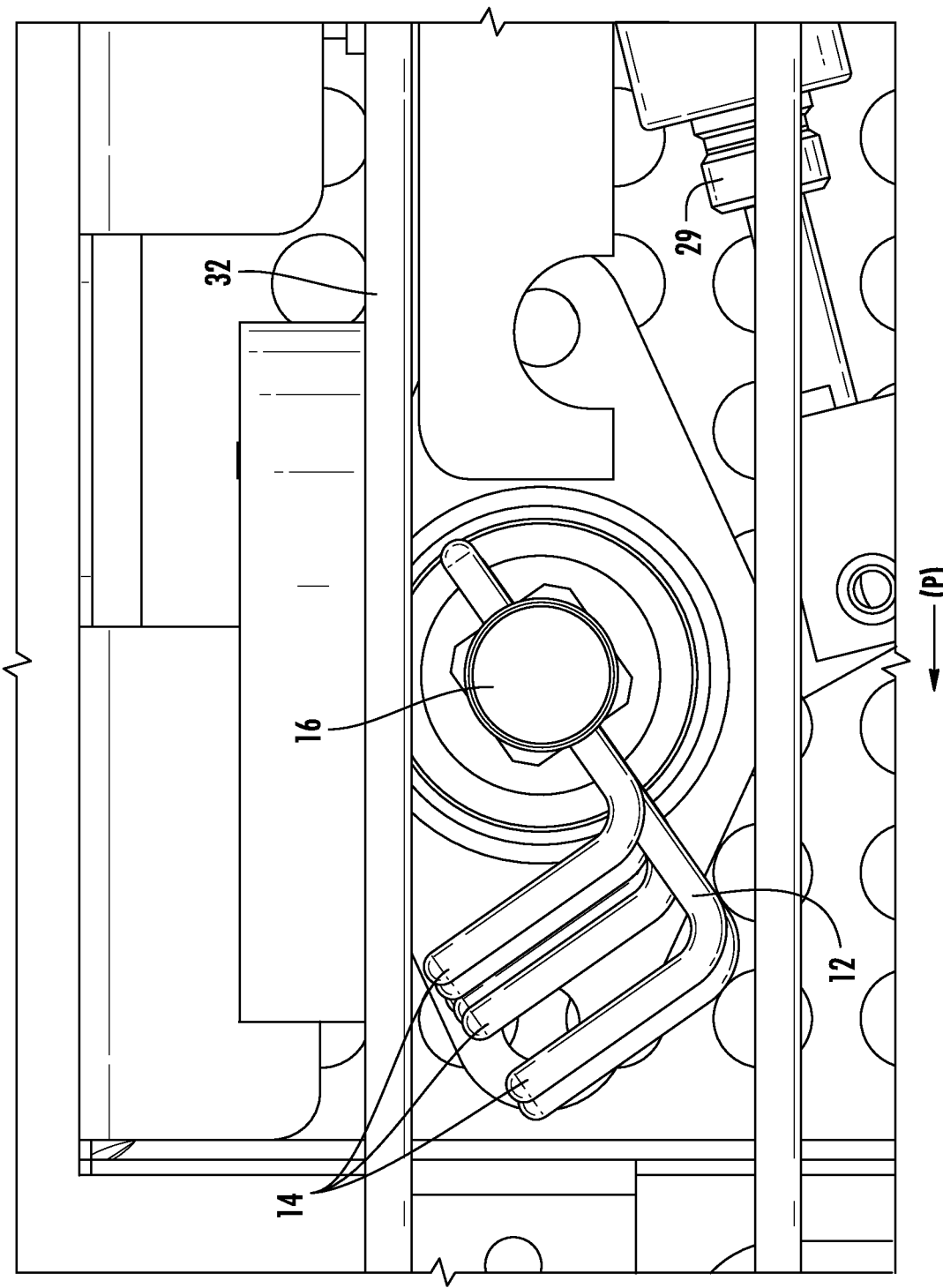
FIG. 4B is a side view of the alignment system of FIGS. 1 and 2 with the linkage bar in a second position.

The controller 23 is configured to selectively drive the linkage bar 16 based on a signal from the sensor 20 such that the plurality of fingers 14 are driven between: (1) a first position in which the plurality of fingers 14 are adapted to extend into a conveying path of a product conveyor 30, and (2) a second position in which the plurality of fingers 14 are adapted to be positioned away from the conveying path of the product conveyor 30. The first position is shown in FIG. 4A, and the second position is shown in FIG. 4B. The fingers 14 are generally maintained in the first position, and are only driven out of the conveying path of products 2 once all of the products 2 are properly aligned due to engagement with the finger 14. As used herein, the term conveying path refers to a predetermined area of the conveyor 30 designated to move products 2 from one end of the conveyor 30 to an opposite end of the conveyor 30. A conveying direction (P) is illustrated in the drawings.

In one embodiment, the actuator 29 is a pneumatic cylinder and provides pressurized air to drive the linkage bar 16 between the first position and the second position. One of ordinary skill in the art would understand that any type of actuator components, including pneumatic cylinders, solenoids, motors, cams, drive shafts, gears, etc., can be used to drive the linkage bar 16 between the first position and the second position. As illustrated, a first end of the actuator 29 engages an end of the linkage bar 16 and a second end of the actuator 29 is fixed. The second end of the actuator 29 can be fixed to any surrounding structure or frame, such as a frame of the conveyor 30. The actuator 29 can be fixed directly to the linkage bar 16 or connected to some intermediate coupling that attaches to the linkage bar 16.

Figure 7:
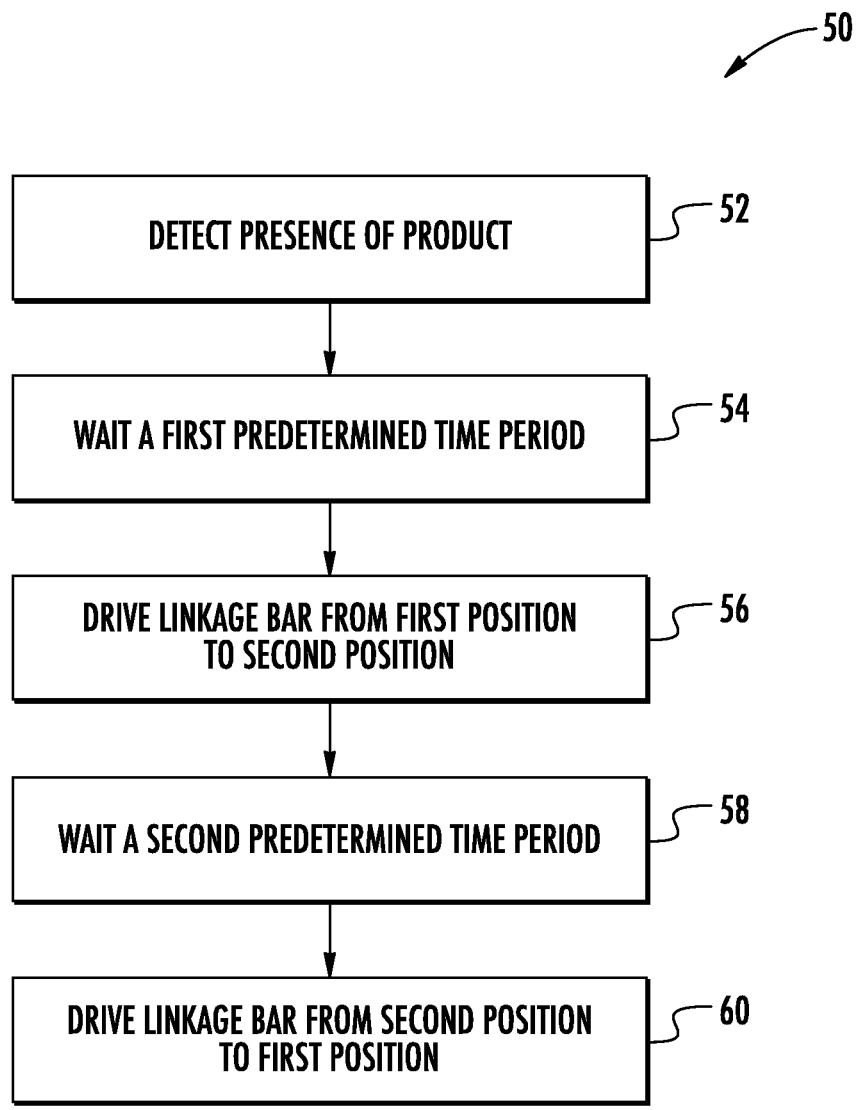
FIG. 7 is a flow diagram of logic for a controller of the alignment system.

In one embodiment, the controller 23 is configured to wait a first predetermined time period after the sensor 20 detects the presence of a product 2 before driving the plurality of fingers 14 from the first position to the second position. A delay counter or other component can be used in the controller 23 to perform the waiting function. One embodiment of the logic 50 used by the controller 23 is shown in FIG. 7. As shown in FIG. 7, the logic 50 includes the following steps: detect presence of product 52; wait a first predetermined time period 54; drive linkage bar from first position to second position 56; wait a second predetermined time period 58; and drive linkage bar from second position to first position 60. One of ordinary skill in the art would understand that the logic 50 can include more or less steps than those illustrated in FIG. 7. Additionally, this logic 50 can be implemented and cycled through for each of row of products advancing towards the fingers along the conveyor. The logic is configured to wait a predetermined time period to allow all products in a row of products to engage the respective fingers, such that the leading edge of all products in a row of products are aligned, before moving the fingers 14 away from the conveying path of the products.

One of ordinary skill in the art would understand that the first and second predetermined time periods can vary depending on many factors, including running speed of the product conveyor 30, dimensions of the products 2, speed of the actuator 29, the amount of misalignment, etc.

In another embodiment, a conveyor arrangement is provided that includes both the alignment system 1 and an associated product conveyor 30. In one embodiment, the product conveyor 30 includes a plurality of bands 32 that are driven by two end rollers. The alignment system 1 is identical to the alignment system described in detail above.

Figure 6:
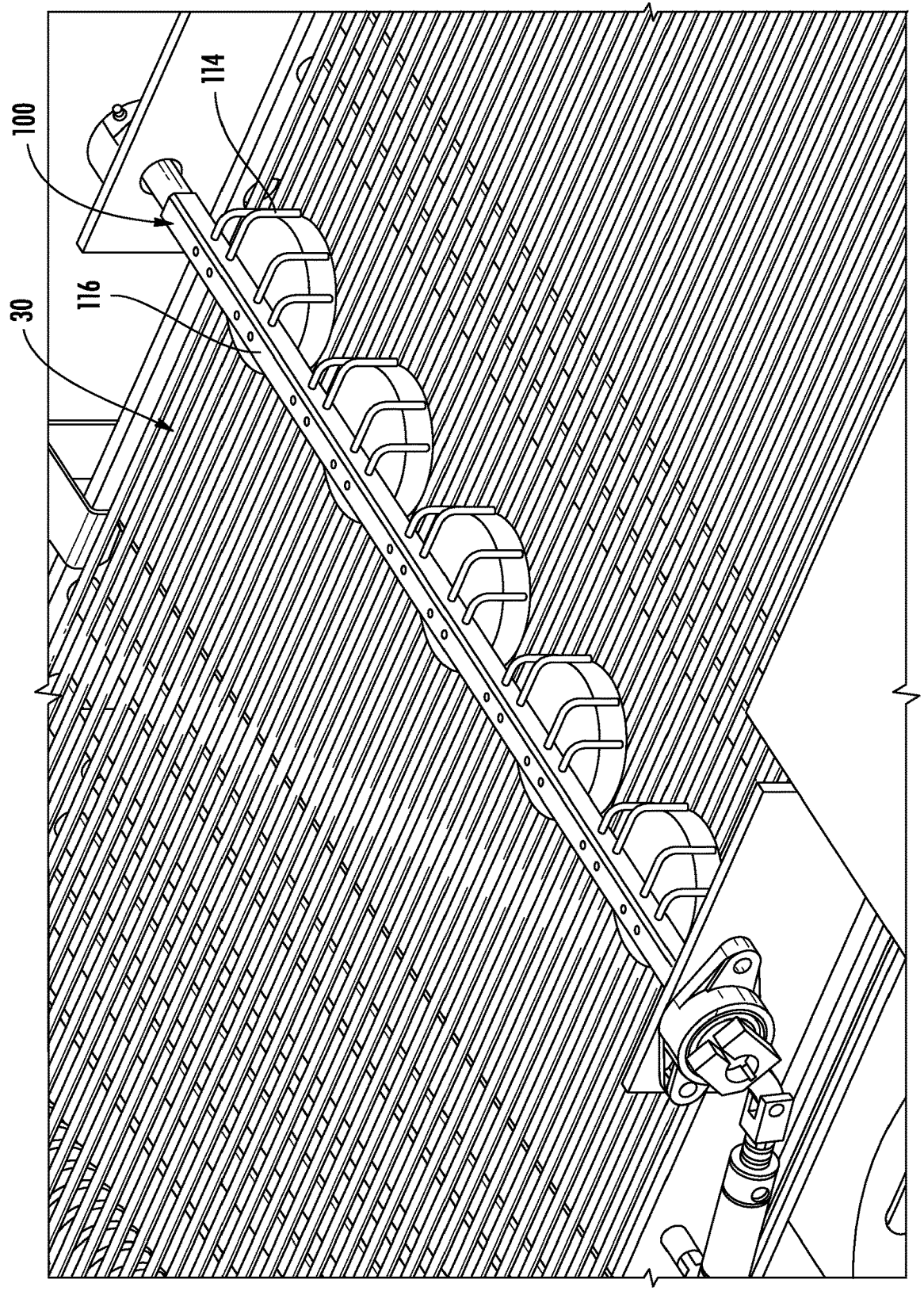
FIG. 6 is a perspective view of an embodiment of an alignment system with an overhead linkage bar.

In one embodiment, shown most clearly in FIG. 6, the linkage bar 116 is mounted above the product conveyor 30. This alignment assembly 100 is otherwise identical to the alignment assembly 10 described in detail above, and similarly drives the linkage bar 116 between a first position and a second position such that the associated fingers 114 are either in the conveying path of the products or away from the conveying path of the products. The associated arrangement including the alignment assembly 100 would include an identical sensor 20, controller 23, actuator, and other components as described above with respect to the alignment system 1 and the alignment assembly 10.

As shown most clearly in FIG. 1, in one embodiment, the linkage bar 16 is mounted below the product conveyor 30, and the plurality of fingers 14 extend between the plurality of bands 32 in the first position.

In another embodiment, a method of aligning products 2 on a product conveyor 30 is provided. The method includes providing: a product conveyor 30 adapted to drive products 2 along a conveying path (P), and an alignment arrangement 1. The alignment arrangement 1 includes a plurality of arms 12. Each arm 12 includes a plurality of fingers 14 having an arcuate orientation. A linkage bar 16 is connected to the plurality of arms 12. A sensor 20 is adapted to detect a presence of a product 2 in an area defined between the plurality of fingers 14. A controller 23 is configured to selectively drive the linkage bar 16 based on a signal from the sensor 20. The method includes advancing products 2 on the product conveyor 30 into engagement with the plurality of fingers 14 such that the products 2 are shifted to align with a predetermined centerline. A plurality of predetermined centerlines ($CL_1$-$CL_5$) for rows of products 2 are shown in FIG. 2. These predetermined centerlines ($CL_1$-$CL_5$) represent ideal paths for products being advanced by the conveyor. The centerlines ($CL_1$-$CL_5$) extend parallel along the conveyor 30 surface. The ideal paths for the advancing products 2 can be based on a variety of factors, such as the requirements and characteristics of a subsequent processing assembly that receives the products 2 from this conveyor 30. Any misalignment of products 2 with these predetermined centerlines ($CL_1$-$CL_5$) causes issues with subsequent processing of the products 2, such as stacking of the products 2. The method includes detecting a presence of the products 2 in an area defined between the plurality of fingers 14 via the sensor 20. The method includes driving the plurality of fingers 14 between (1) a first position in which the plurality of fingers 14 extend between into the conveying path of the product conveyor 30, and (2) a second position in which the plurality of fingers 14 are positioned away from the conveying path of the product conveyor 30 based on the signal from the sensor 20.

The method includes aligning a row of advancing products 2 via the plurality of fingers 14 of the plurality of arms 12, such that a leading edge of each product 2 of the row of advancing products 2 is aligned. This alignment occurs based on the fingers 14 each temporarily holding a respective product 2. The leading edges of the products 2 are aligned according to a predetermined perpendicular line extending laterally across the conveyor 30 (shown most clearly by FIG. 2). The linkage bar 16 is then moved to the second position to release the products 2, and the leading edges of the products 2 are aligned with each other and each product 2 is centered about its respective predetermined centerline ($CL_1$-$CL_5$).

Figure 5A:
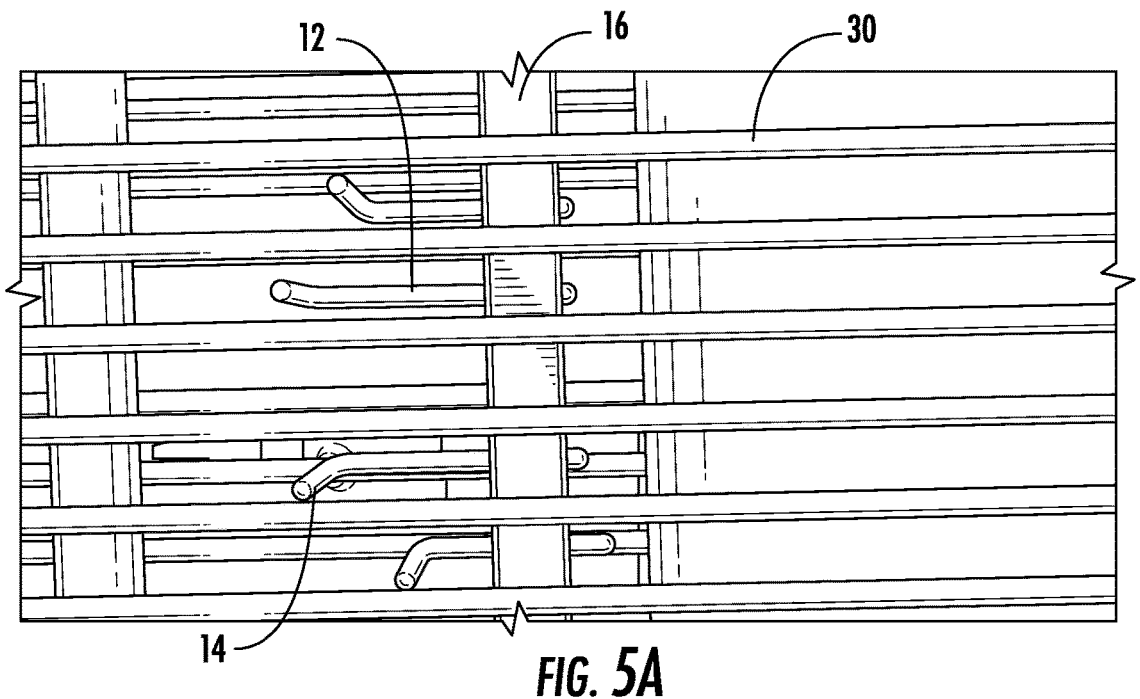
FIGS. 5A-5H illustrate a top view of a product advancing towards one set of fingers of the alignment system, engaging the set of fingers, and advancing beyond the set of fingers.
Figure 5B:
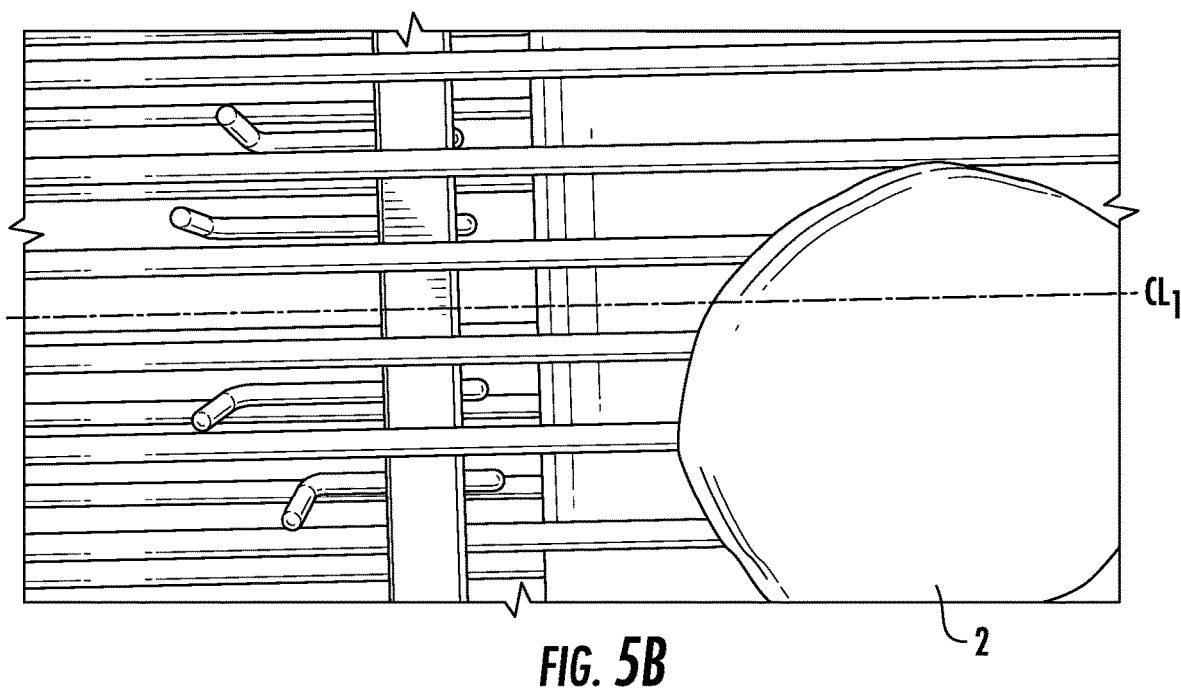
Figure 5C:
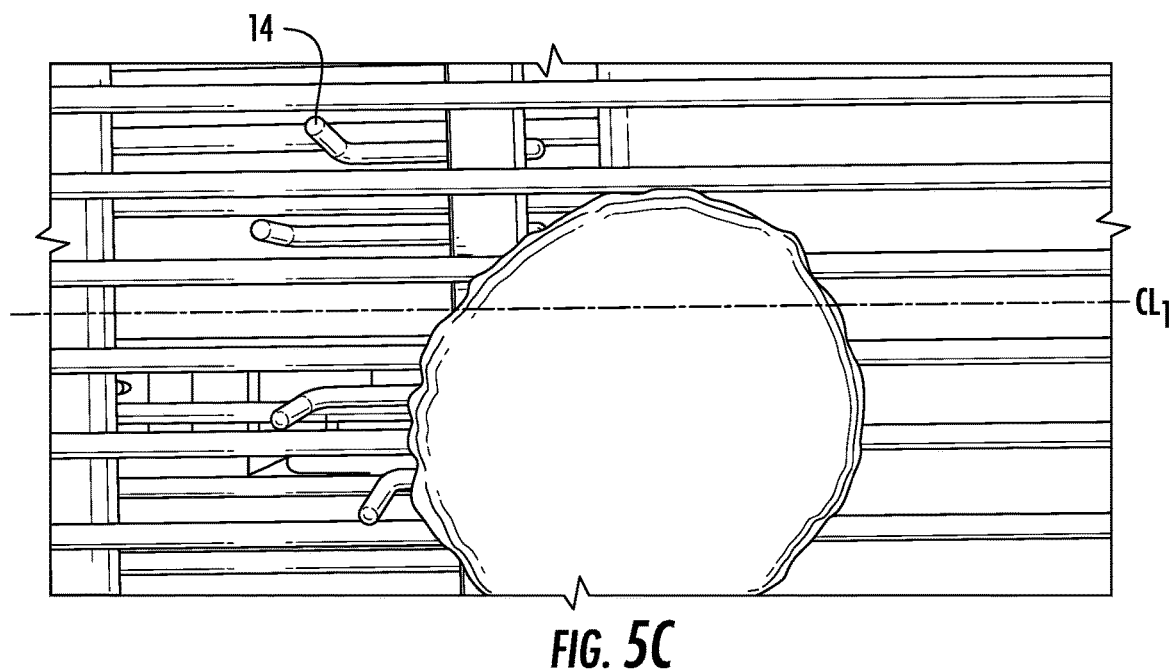
Figure 5D:
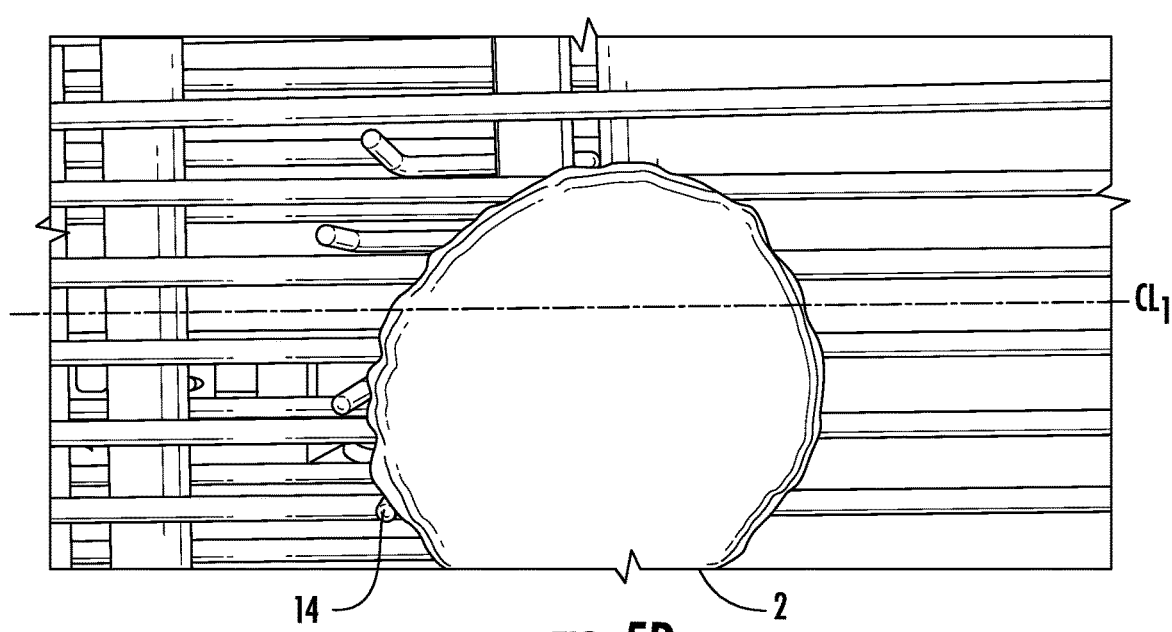
Figure 5E:
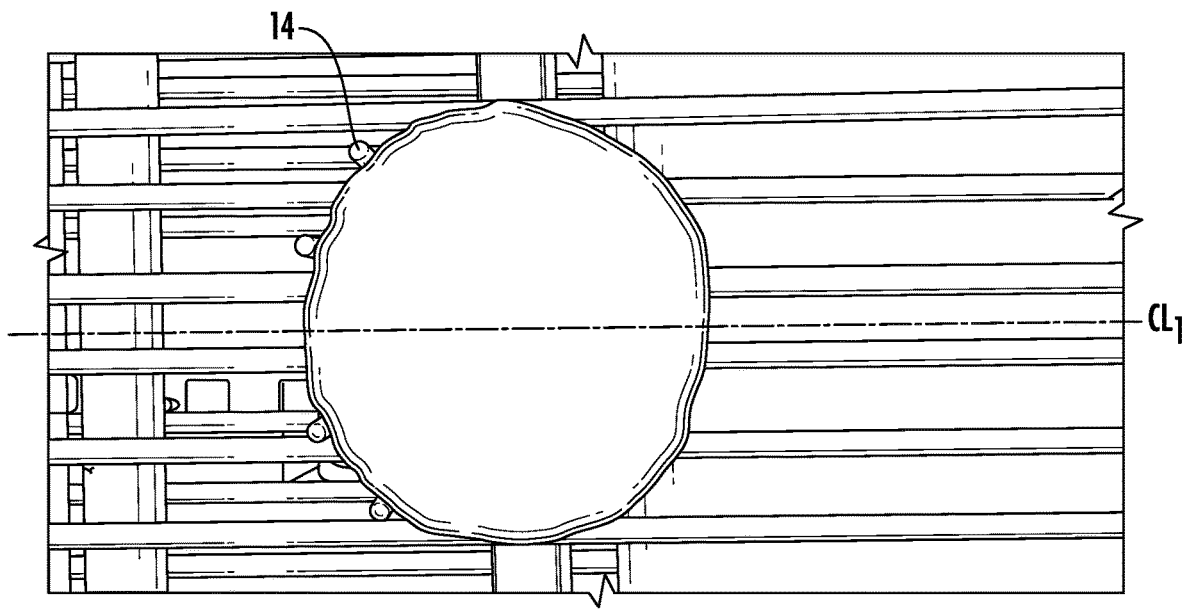
Figure 5F:
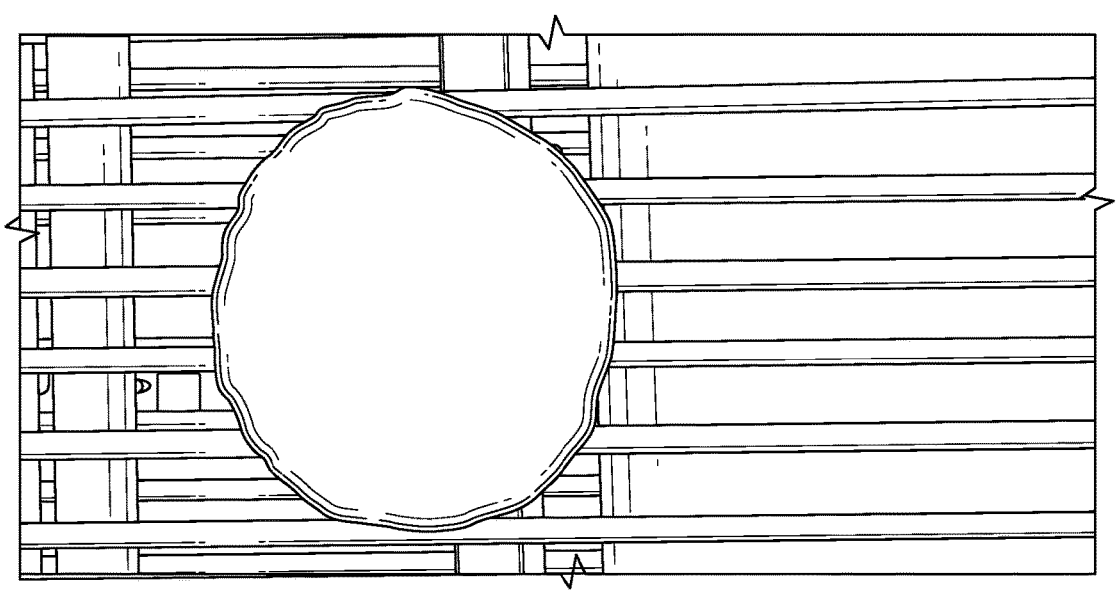
Figure 5G:
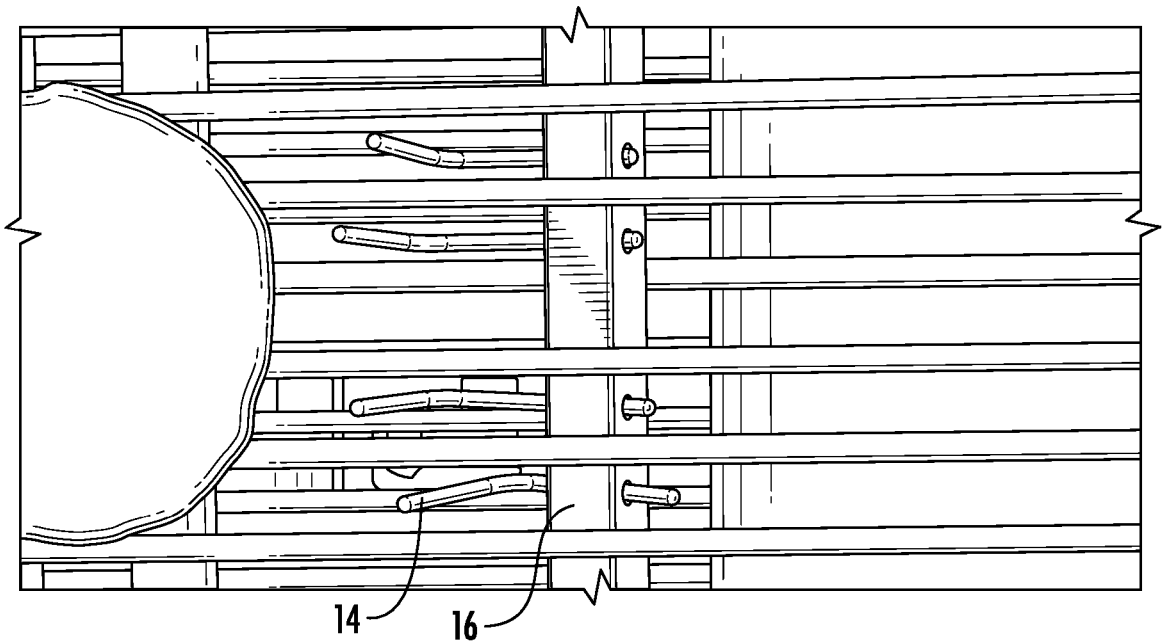
Figure 5H:
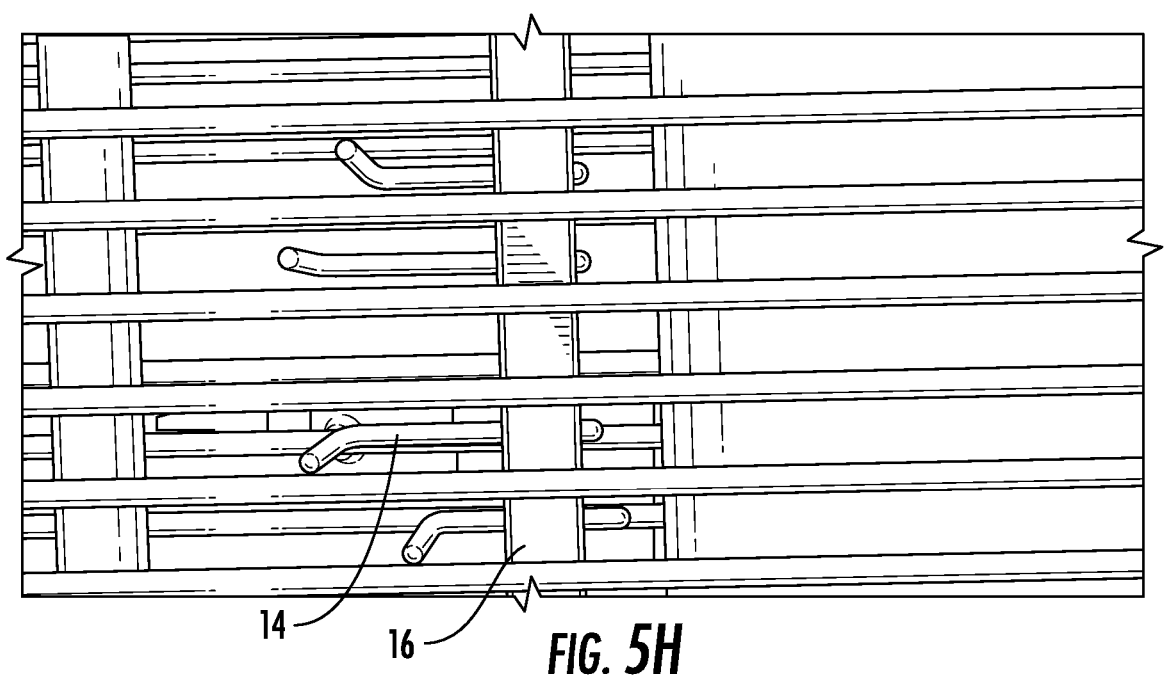

FIGS. 5A-5H show a magnified view for a single lane of product 2 advancing along the conveyor towards a single arm 12 and set of fingers 14. The linkage bar 16 is shown below the conveyor 30. FIG. 5A shows the arrangement prior to a product encountering the alignment features. The arm 12 and fingers 14 are maintained in the first position, i.e. the fingers 14 extend into the conveying path of the conveyor. FIGS. 5B and 5C show the advancing product 2 (i.e. hamburger patty) prior to engaging the fingers 14. A predetermined centerline $CL_1$ is illustrated in FIGS. 5B-5E. As disclosed above, the predetermined centerline $CL_1$ is determined based on an ideal position of the product 2 as it advances along the conveyor 30. FIG. 5D illustrates a portion of the product 2 engage one of the fingers 14. As the conveyor 30 continues to drive the product 2 in the advancing direction, the finger 14 urges the product 2 to rotate towards the predetermined centerline $CL_1$ until a center of the product 2 is aligned with the predetermined centerline $CL_1$, as shown in FIG. 5E. As the product 2 is aligned with the predetermined centerline $CL_1$, the sensor 20 detects the presence of the product 2. Based on a signal from the sensor 20, the controller 23 then provides a signal to the actuator to lower the fingers 14 (moving the linkage bar 16 from the first position to the second position), as shown in FIG. 5F. As shown in FIG. 5G, once the product 2 is free of the fingers 14, the product 2 is driven by the conveyor 30 beyond the linkage bar 16 and towards an end of the conveyor 30. After a predetermined time period, the controller 23 then provides a signal to the actuator to drive the linkage bar 16 back to the initial, first position.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. An alignment system comprising:
    a plurality of arms, each arm directly connected to at least one finger, thereby establishing a plurality of fingers; and a linkage bar connected to the plurality of arms;
    a sensor adapted to detect a presence of a product in an area defined between the plurality of fingers; and
    a controller configured to selectively drive the linkage bar based on a signal from the sensor indicating that a product is in an area defined between the plurality of fingers such that the plurality of fingers are driven from:
        (1) a nominal first position in which the plurality of fingers are adapted to extend into a conveying path of a product conveyor, to
        (2) a second position in which the plurality of fingers are adapted to be positioned away from the conveying path of the product conveyor.

2. The alignment system of claim 1, wherein the plurality of fingers together form an arcuate orientation.

3. The alignment system of claim 1, wherein the plurality of arms includes at least four arms.

4. The alignment system of claim 1, wherein the sensor is a photo-sensor.

5. The alignment system of claim 1, wherein the plurality of fingers includes at least four fingers.

6. The alignment system of claim 1, wherein the controller actuates a pneumatic cylinder to drive the linkage bar between the first position and the second position.

7. The alignment system of claim 1, wherein the controller actuates a servo motor to drive the linkage bar between the first position and the second position.

8. The alignment system of claim 1, wherein each finger of the plurality of fingers is offset relative to each other.

9. The alignment system of claim 1, wherein each finger of the plurality of fingers is disposed at a distinct distance from the linkage bar.

10. The alignment system of claim 1, wherein the plurality of arms includes at least four arms, wherein the first arm comprises a length, the second arm comprises a length greater than the length of the first arm, the third arm comprises a length greater than the length of the second arm, and the fourth arm comprises a length greater than the length of the third arm.

11. A conveyor arrangement comprising:
a product conveyor;
an alignment system comprising:
- a plurality of arms, each arm including at least one finger, thereby establishing at least four fingers, wherein the at least four fingers together form an arcuate orientation,
- a linkage bar connected to the plurality of arms;
- a sensor adapted to detect a presence of a product in an area defined between the at least four fingers; and
- a controller configured to selectively drive the linkage bar based on a signal from the sensor such that the at least four fingers are driven between:
  (1) a first position in which the at least four fingers extend into a conveying path of the product conveyor, and
  (2) a second position in which the at least four fingers are positioned away from the conveying path of the product conveyor;
wherein the controller is configured to wait a first predetermined time period after the sensor detects the presence of a product before driving the at least four fingers from the first position to the second position and wherein the controller is configured to wait a second predetermined time period before driving the at least four fingers back to the first position from the second position.

12. The conveyor arrangement of claim 11, wherein the linkage bar is mounted above the product conveyor.

13. The conveyor arrangement of claim 11, wherein the linkage bar is mounted below the product conveyor, the product conveyor includes a plurality of bands, and the at least four fingers extend between the plurality of bands in the first position.

14. The conveyor arrangement of claim 11, wherein the at least four fingers are each offset relative to each other.

15. The conveyor arrangement of claim 11, wherein the at least four fingers are each disposed at a distinct distance from the linkage bar.

16. A method of aligning products on a product conveyor, the method comprising:
providing:
- a product conveyor adapted to drive products along a conveying path; and
- an alignment arrangement including a plurality of arms, each arm directly connected to at least one finger, thereby establishing a plurality of fingers;
- a linkage bar connected to the plurality of arms;
- a sensor adapted to detect a presence of a product in an area defined between the plurality of fingers; and
- a controller configured to selectively drive the linkage bar based on a signal from the sensor indicating that a product is in an area defined between the plurality of fingers;
advancing products on the product conveyor into engagement with the plurality of fingers such that the products are shifted to align with a predetermined centerline;
detecting a presence of the products in the area defined between the plurality of fingers via the sensor;
driving the plurality of fingers from (1) a nominal first position in which the plurality of fingers extend between into the conveying path of the product conveyor, to (2) a second position in which the plurality of fingers are positioned away from the conveying path of the product conveyor based on the signal from the sensor indicating that a product is in an area defined between the plurality of fingers.

17. The method of claim 16, wherein the products each include a leading edge with a rounded profile.

18. The method of claim 16, wherein the controller is configured to (1) wait a first determined time period after the sensor detects the presence of the products, and (2) wait a second predetermined time period before driving the plurality of fingers back to the first position from the second position.

19. The method of claim 16, wherein the plurality of fingers together form an arcuate orientation.

20. The method of claim 16, wherein the method further comprises:
aligning a row of advancing products via the plurality of fingers, such that a leading edge of each product of the row of advancing products is aligned.

* * * * *